(12) United States Patent
Check et al.

(10) Patent No.: US 10,108,569 B2
(45) Date of Patent: *Oct. 23, 2018

(54) ARBITRATION IN AN SRIOV ENVIRONMENT

(71) Applicant: International Business Machines Corporation, Armonk, NY (US)

(72) Inventors: Mark A. Check, Hopewell Junction, NY (US); Vincenzo Condorelli, Altendorf (CH); Nihad Hadzic, Wappingers Falls, NY (US); William Santiago Fernandez, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/844,053

(22) Filed: Sep. 3, 2015

(65) Prior Publication Data

US 2016/0147685 A1    May 26, 2016

Related U.S. Application Data

(63) Continuation of application No. 14/552,666, filed on Nov. 25, 2014.

(51) Int. Cl.
*G06F 13/14* (2006.01)
*G06F 13/362* (2006.01)
(Continued)

(52) U.S. Cl.
CPC ............ *G06F 13/3625* (2013.01); *G06F 1/24* (2013.01); *G06F 9/45558* (2013.01);
(Continued)

(58) Field of Classification Search
None
See application file for complete search history.

(56) References Cited

U.S. PATENT DOCUMENTS

2011/0022809 A1* 1/2011 Satoh ............... G06F 9/45533
711/155
2013/0074094 A1* 3/2013 Lewis ............... G06F 9/4881
718/104

(Continued)

OTHER PUBLICATIONS

List of IBM Patents or Patent Applications Treated as Related; (Appendix P), Filed Apr. 13, 2016; 2 pages.

(Continued)

*Primary Examiner* — Ilwoo Park
(74) *Attorney, Agent, or Firm* — Cantor Colburn LLP; Steven Chiu

(57) ABSTRACT

In one embodiment, a computer-implemented method includes assigning a time budget to each of a plurality of virtual functions in a single-root input/output (SRIOV) environment, where a first time budget of a first virtual function indicates a quantity of cycles on an engine of the SRIOV environment allowed to the first virtual function within a time slice. A plurality of requests issued by the plurality of virtual functions are selected by a computer processor, where the selecting excludes requests issued by virtual functions that have used their associated time budgets of cycles in a current time slice. The selected plurality of requests are delivered to the engine for processing. The time budgets of the virtual functions are reset and a new time slice begins, at the end of the current time slice.

7 Claims, 4 Drawing Sheets

(51) Int. Cl.
   *G06F 9/455*   (2018.01)
   *G06F 1/24*    (2006.01)
   *G06F 13/372*  (2006.01)
   *G06F 13/42*   (2006.01)

(52) U.S. Cl.
   CPC ........ *G06F 13/372* (2013.01); *G06F 13/4221* (2013.01); *G06F 2009/45579* (2013.01)

(56) References Cited

U.S. PATENT DOCUMENTS

| | | | |
|---|---|---|---|
| 2013/0247066 A1* | 9/2013 | Dodge | G06F 9/4881 718/104 |
| 2014/0181828 A1* | 6/2014 | Bird | G06F 9/5016 718/103 |
| 2015/0278130 A1* | 10/2015 | Walker | G06F 9/45533 710/263 |
| 2016/0085696 A1* | 3/2016 | Chiu | G06F 3/0647 711/164 |

OTHER PUBLICATIONS

Mark A. Checki, et al., "Arbitration in an SRIOV Environment", U.S. Appl. No. 14/552,666, filed Nov. 25, 2014.

* cited by examiner

ARBITRATION IN AN SRIOV ENVIRONMENT

DOMESTIC PRIORITY

This application is a continuation of U.S. patent application Ser. No. 14/552,666, filed Nov. 25, 2014, the disclosure of which is incorporated by reference herein in its entirety.

BACKGROUND

Various embodiments of this disclosure relate to single-root input/output virtualization (SRIOV) and, more particularly, to arbitration in an SRIOV environment.

Peripheral component internet express (PCIe) cards, which are connectable to general purpose and other computers via a PCIe interface, can extend the functionality of a computer. In general, each PCIe card has a single physical function. Conventionally, that physical function is coupled to a single logical partition, being an operating system (OS) image or application, on an associated computer system.

SRIOV resides on a computer system hosting a PCIe card and extends the function of an SRIOV-enabled PCIe device by virtualizing multiple functions. In this manner, the physical function of the device can be used by multiple logical partitions, each behaving as if it has access to the full functionality of the card. Thus, SRIOV enables the functionality of a PCIe card to be shared among multiple logical partitions. However, this sharing needs to be done in an organized manner.

An SRIOV environment can include one or multiple engines for performing operations. Those operations, particularly in the case of cryptographic operations, can take many processor or execution cycles to complete. The PCIe hardware and virtual drivers cannot accurately estimate how long each operation will take, and thus, sharing the physical functionality of the card can become a complex task.

SUMMARY

In one embodiment of this disclosure, a computer-implemented method includes assigning a time budget to each of a plurality of virtual functions in an SRIOV environment, where a first time budget of a first virtual function indicates a quantity of cycles on an engine of the SRIOV environment allowed to the first virtual function within a time slice. A plurality of requests issued by the plurality of virtual functions are selected by a computer processor, where the selecting excludes requests issued by virtual functions that have used their associated time budgets of cycles in a current time slice. The selected plurality of requests are delivered to the engine for processing. The time budgets of the virtual functions are reset and a new time slice begins, at the end of the current time slice.

In another embodiment, a system includes a memory and one or more processors communicatively coupled to the memory. The one or more processors are configured to assign a time budget to each of a plurality of virtual functions in a single-root input/output (SRIOV) environment, where a first time budget of a first virtual function indicates a quantity of cycles on an engine of the SRIOV environment allowed to the first virtual function within a time slice. The one or more processors are further configured to select a plurality of requests issued by the plurality of virtual functions, where the selecting excludes requests issued by virtual functions that have used their associated time budgets of cycles in a current time slice. The one or more processors are further configured to deliver the selected plurality of requests to the engine for processing. The one or more processors are further configured to reset the time budgets of the virtual functions and begin a new time slice, at the end of the current time slice.

In yet another embodiment, a computer program product for arbitrating requests in an SRIOV environment includes a computer readable storage medium having program instructions embodied therewith. The program instructions are executable by a processor to cause the processor to perform a method. The method includes assigning a time budget to each of a plurality of virtual functions in an SRIOV environment, where a first time budget of a first virtual function indicates a quantity of cycles on an engine of the SRIOV environment allowed to the first virtual function within a time slice. A plurality of requests issued by the plurality of virtual functions are selected, where the selecting excludes requests issued by virtual functions that have used their associated time budgets of cycles in a current time slice. The selected plurality of requests are delivered to the engine for processing. The time budgets of the virtual functions are reset and a new time slice begins, at the end of the current time slice.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Various embodiments of this disclosure are arbitration systems configured to manage requests from virtual functions within an SRIOV environment. Some embodiments may ensure that each virtual function received a fair share of the processing time, but may also implement prioritization of some virtual functions over others.

Figure 1:
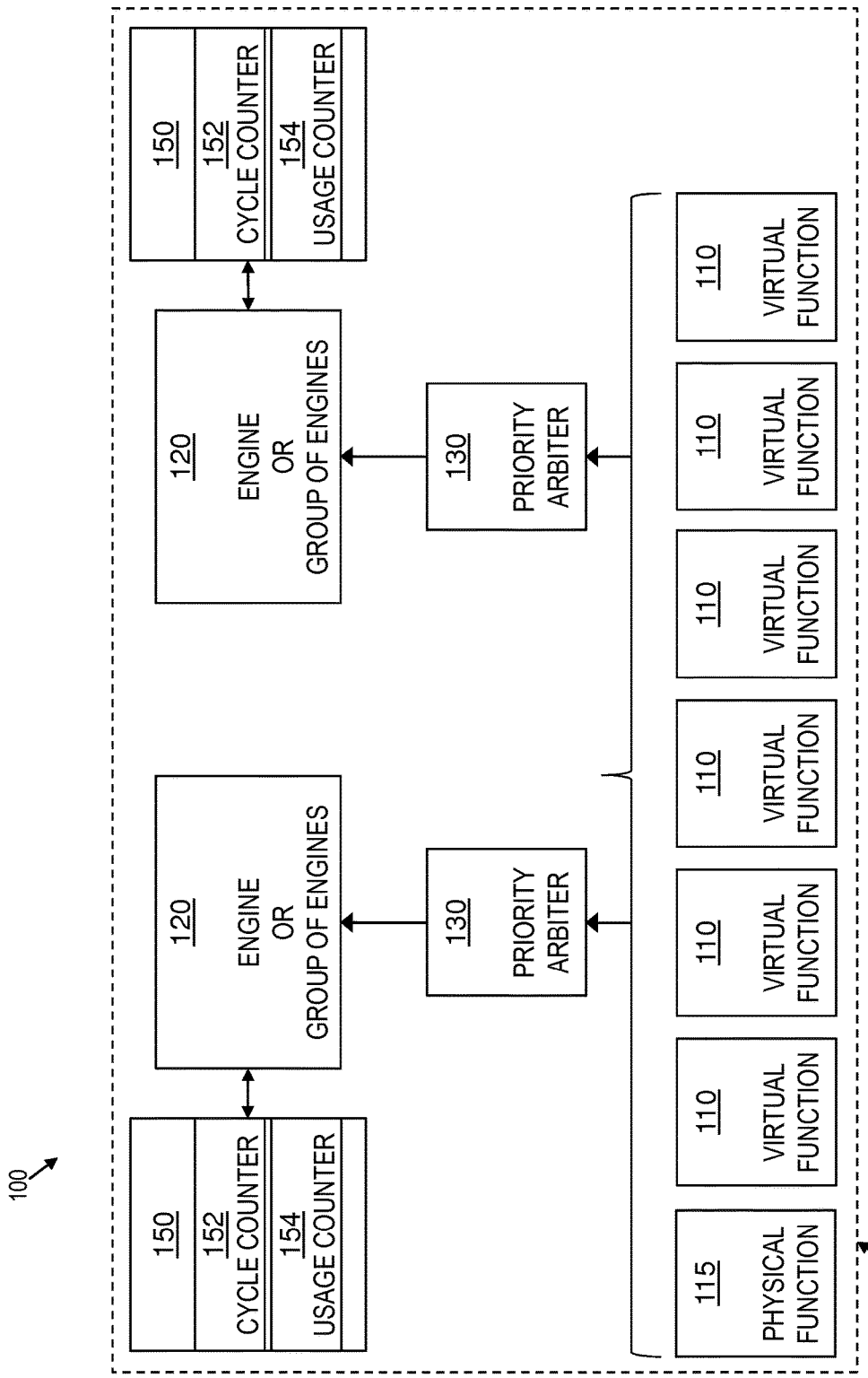
FIG. 1 is a block diagram of an arbitration system in an SRIOV environment, according to some embodiments of this disclosure.

FIG. 1 is a block diagram of an arbitration system 100 in an SRIOV environment 105, according to some embodiments of this disclosure. As shown, the arbitration system 100 may enable a physical function 115, virtualized into one or more virtual functions 110. The virtual functions 110 may issue requests of the one or more engines 120 of the SRIOV environment 105. In some embodiments, these engines 120 may be cryptographic engines configured to perform cryptographic operations. One or more priority arbiters 130 may manage the requests made by the virtual functions 110 and may deliver these requests to the engines 120 of the PCIe device. The arbitration system 100 may additionally include one or more counters 150, configured to monitor and count requests and engine usage in real time. These aspects of the arbitration system 100 will be described further below.

Each virtual function 110 may be tied to and associated with a logical partition, e.g., an OS image or an application, desiring to use the physical function 115. In some embodiments, each virtual function 110 may be associated with a single such logical partition. Each virtual function 110 may make requests of the engines 120 on behalf of its associated logical partition. The priority arbiters 130, which may be implemented in hardware or software, for example, may manage or arbitrate such requests, delivering them to the engines 120 for processing.

In some embodiments, the arbitration system 100, such as by way of the priority arbiters 130, may use one or more mechanisms for arbitrating requests of the virtual functions 110. Further, in some embodiments, the arbitration system 100 may be capable of more than a single such mechanism and may select between the available mechanisms to arbitrate the requests. These mechanisms may include, for example, arbitration based on cycles used, arbitration based on size of data consumed, or arbitration based on priority credits used. Each of these mechanisms will be described further below.

Operations performed by the engines 120, particularly cryptographic operations, can take a considerable time. More specifically, operations can take numerous cycles, i.e., processor or execution cycles, of an engine's processor on the PCIe card. In some cases, the amount of time to complete operations may be difficult to estimate. In the SRIOV environment 105, the various virtual functions 110 need not all require the same amount of time with the engines 120, and the virtual functions 110 need not all have the same priority. In some embodiments, the present arbitration system 100 may prioritize the virtual functions 110 and share use of the engines 120 across all the virtual functions 110.

The arbitration system 100 may establish a time slice, which may be a period time or quantity of cycles, which may be processor cycles or execution cycles, to divide among the various virtual functions 110. The execution time of the engines may thus be made up of multiple time slices, one after the other. The span of the time slice may vary based on implementation, but in some embodiments, the time slice may include enough cycles to be divided unequally among the virtual functions 110. Each virtual function 110 may be assigned or allotted a portion, which may be a percentage or a quantity of cycles, of the time slice. The allotments may be based on various factors, depending on the embodiment.

In some embodiments, the allotments may be determined in advance (i.e., before the engines 120 begin processing requests from the virtual functions 110), based on various factors. In some other embodiments, however, the arbitration system 100 may assign allotments based on estimations after having run for an initial period. More specifics of how allotments are made in some embodiments will be described further below. In either case, the time slice may be divided into time budgets of the virtual functions 110. In some cases, these time budgets needs not fill the time slice to capacity, and remaining cycles may be assigned to the virtual functions 110 as needed during a time slice.

After the time allotments are assigned, each virtual function 110 may, as a result, be associated with a quantity of cycles from the time slice. The total of all the allotments may equal the total number of cycles in the time slice. While the virtual functions 110 are running, the arbitration system 100 may generally allow each virtual function 110 to use the engines 120 for no more than the time allotted in a single time slice. The time allotted to each virtual function 110 may act as a time budget for that virtual function 110, and that time budget may be reset after each time slice ends and a new one begins. Thus, an engine's processing time may be divided among the virtual functions 110. In an SRIOV environment 105 where multiple engines 120 exist, each virtual function 110 may be assigned a time budget for each engine 120 in some embodiments.

In some embodiments, a given operation that has started for a virtual function 110 prior to that virtual function 110 running out of cycles may be allowed to complete, instead of being aborted in the middle of the operation. The arbitration system 100 may make estimations as to how many cycles each operation will consume, and these estimations may be useful in determining whether to begin executing an operation in the current time slice. For example, when a virtual function 110 is near its time budget, the arbitration system 100 may opt not to run an operation of that virtual function 110 in a case where it is likely the operation will lead the virtual function to exceed, or exceed by a predetermined value, the total number of cycles in its time budget. For example, a virtual function 110 may request a short Advanced Encryption Standard (AES) encryption operation that is estimated to require at least five thousand cycles, and that virtual function may have only five hundred cycles left in its time budget. In that case, the arbitration system 100 may opt not to start that operation. More specifically, the priority orbiters 130 may opt not to deliver the request for that operation from the virtual function 110 in question.

In some embodiments, the arbitration system 100 may reduce a virtual function's time budget in a particular time slice for exceeding, or exceeding by a predetermined value, the time budget in an earlier time slice. In some further embodiments, the amount of the time budget reduction may be based on the amount by which the time budget was previously exceeded. For example, a virtual function 110 may request an operation, which may be estimated to take five thousand cycles, when that virtual function 110 has six thousand cycles remaining in its time budget. An engine 120 may start executing the operation in a current time cycle, and the operation may end up taking 20,000 cycles. The operation may be allowed to run to completion in the current time slice, but this takes the virtual function 110 significantly over its time budget. In that case, the virtual function's time budget may be reduced in the next time slice. More specifically, in some embodiments, the virtual function's time budget may be reduced to zero, so that it is locked out in the next time slice. This reduction may allow other virtual function's to catch up on the work that was not performed on their behalf in the current time slice.

The granularity of the time budgeting may have a significant effect on the logical partitions. For instance, if the time slice includes only ten cycles, to be divided among five virtual functions 110, the arbitration system 100 may be limited in how these mere ten cycles can be distributed, such that all virtual functions 110 receive at least one cycle. In contrast, if the time slice includes a hundred-thousand cycles, these cycles may be divided among the five virtual functions 110 in numerous combination, resulting in a much more refined distinction in the time budgets assigned to the various virtual functions 110.

In some embodiments, a virtual function's entire time budget need not be used in a single session with an engine

120, where a session is defined as continuous time with an engine 120 in response to a request. In some cases, using up an entire time budget in a single session may prove detrimental to other virtual functions 110, which may need attention sooner rather than later. Thus, in some embodiments, the arbitration system 100 may limit the amount of time for virtual function's each session with an engine 120. In some other embodiments, however, the length of a time slice may be enough of a limitation, such that each virtual function 110 can afford to wait until all other virtual functions 110 have used their time budgets within a time slice. In that case, no further limitation need be established. Thus, the length of a time slice may be chosen such that no virtual function's logical partition will suffer if it uses up its time budget too early in a given time slice, thereby having no access to the associated engine 120 for the remainder of the time slice.

While the use of time budgets may ensure that processing time is fairly distributed among the virtual functions 110, further mechanisms may be needed to address prioritization. It may be the case that some virtual functions 110 are given higher priority than others, for example, due to the associated logical partitions having higher priority. For instance, due to quality of service (QoS) requirements, a particular virtual function 110 may require high priority to ensure its logical partition runs as intended.

Instead of or in addition to using the above-described time budgets, some embodiments of the arbitration system 100 may arbitrate requests from virtual functions 110 based on the size of data consumed in the requests. Further, in some embodiments, the arbitration system 100 may use size budgets in the same manner, or a similar manner, in which time budgets may be used as described above. In other words, each virtual function 110 may be assigned a size budget, indicating the amount of data allowed to be consumed by requests from that virtual function 110 within a single time slice.

For example, a virtual function 110 may be allowed 1000 bytes of data to be consumed per time slice. In that case, the priority arbiters 130 may allow the virtual function 110 to send two requests of 500 bytes each or 100 requests of ten bytes each. When the virtual function 110 has sent an amount of data equaling or exceeding its allotment, 1000 bytes, it may be disallowed from sending any more requests in the current time slice.

In some embodiments, the priority arbiters 130 may continue to allow requests from a virtual function 110 until that virtual function's size budget is reached. Thus, for example, if a virtual function 110 has 100 bytes left in its time budget and tries to make a request of 5000 bytes, the priority arbiters 130 may allow this and deliver that request to the engines 120, but may then disallow future requests from that virtual function 110 within the current time slice.

To address priority concerns, some embodiments of the arbitration system 100 may assign credits to each virtual function 110, such that the credits represent the priorities of the associated virtual functions 110. For example, and not by way of limitation, there may exist three level of priority: high, medium, and low. In this example, high priority virtual functions 110 may receive three credit, medium priority virtual functions 110 may receive two credits, and low priority virtual functions may receive one credit.

Each credit may correspond to the quantity of times a virtual function 110 may access the engines 120. More specifically, each time a request issued by a virtual function 110 is given processing attention by an engine 120 or a processing session with an engine 120, one credit is used up.

In some cases, a virtual function 110 may break an operation into multiple requests. Each request may then consume a single credit, leading to a single operation sometimes consuming multiple credits if broken into multiple requests. A virtual function 110 with more credits than another may thus have a greater quantity of processing sessions with the engines 120. If the SRIOV environment 105 includes more than a single engine 120, then in some embodiments, each virtual function 110 may be assigned a priority and associated number of credits for each engine 120. In that case, for example, a virtual function 110 may have a different priority level for different engines 120.

The priorities and time budgets per time slice of each virtual function 110 may be based on various factors. In some embodiments, the priorities and time budgets may be assigned based on what has been purchased by users owning the virtual functions 110 the business model requirements for each logical partition of the virtual functions 110. In some embodiments, a manager of the arbitration system 100 may assign time budgets and priorities with QoS requirements for the virtual functions 110 in mind. Using the mechanisms of this disclosure, these QoS requirements may be independent for each virtual function 110, and the virtual functions 110 need not be aware of the QoS requirements of other virtual functions sharing the same PCIe card. Provided below are examples of how these assignments may be made.

In some cases, a customer owns the SRIOV-enabled PCIe card and is managing the arbitration system 100. The customer may have one or more applications it wishes to run or support with the card. In the customer's view, some of these applications may be more time sensitive than others, and some may require more computing power than others. In that case, the customer may assign priorities and time budgets to virtual functions 110 based on its own desires for the applications associated with those virtual functions 110. For instance, the customer may have a first application for purchase and transfer events, associated with a first virtual function 110, that is extremely time sensitive but is expected to have low cycle usage. This first virtual function 110 may be assigned a high priority and a low time budget (e.g., 15% of cycles in the time slice). A second application, associated with a second virtual function 110, for performing batch processes may require significant computation but may not be time sensitive. This second virtual function 110 may be assigned a high time budget (e.g., 50% of cycles) and a low priority. A third application of a third virtual function 110 may perform analytic computations to identify fraud. This third virtual function 110 may be assigned a moderate time budget (e.g., 35% of cycles) and medium priority. However, the customer may wish to adjust time budgets based on what is deemed important. To ensure that the purchase application of the first virtual function 110 is never denied time on the engines 120. In that case, the first virtual function may be assigned an increased time budget of (e.g., 25%), thus reducing the time budget that might be assigned to other virtual functions 110 (e.g., reducing the second virtual function 110 to 40%, or reducing the third virtual function 110 to 25%). It will be understood that various assignments may be made for a group of applications, based on the customer's desires and priorities.

In some other cases, a hosting company owns the SRIOV-enabled PCIe card and manages the arbitration system 100, and thus that hosting company makes priority and time budget assignments. Each customer may rent time on the card for that customer's one or more virtual functions 110. Thus, the assignments may be based, at least in part, on the customers' requirements or the services paid for by the customers. For instance, of three customers, a first customer with a first virtual function 110 may pay for high priority and 25% of the cycles; a second customer with a second virtual function 110 may pay for medium priority and 40% of the cycles; and a third customer with a third virtual function 110 may pay for low priority and 30% of the card cycles. In this example, the card is not sold to full capacity. The arbitration system 100 may handle the limits of time budgets and priorities in various ways, based on implementation or instructions provided by the hosting company. For instance, if the first virtual function 110 has a workload spike and requires 35% of the cycles in a particular time slice, the arbitration system 100 may use the time budgets as hard limits and may cut off that first virtual function 110 after its time budget is reached, thus disallowing the first customer from performing its requested operations in the current time slice. Alternatively, the arbitration system 100 may allow the first virtual function 110 to complete its requested work, so long as the other customers get what they paid for. In that case, the hosting company may charge the first customer for the overage.

To implement the time budgets and prioritization, the arbitration system 100 may use counters 150, which may operate in real-time. The counters 150 may be communicatively coupled to the engines 120. In the case where the virtual engines 110 have distinct time budgets and priorities per engine 120, each engine 120 may have its own set of counters 150. Alternatively, if the time budgets and priorities apply to the set of engines 120 as a whole, then the engines 120 may share a set of counters 150.

The counters 150 may include a cycle counter 152 for each virtual function 110 and a usage counter 154 for each virtual function 110. The cycle counter 152 for a virtual function 110 may count the number of cycles used by that virtual function 110 during the current time slice. When the cycle counter 152 has established that the entire allotted time budget has been used within the current time slice, the associated one or more engines 120 may pause processing requests for the virtual function 110 until the next time slice begins. The usage counter 154 for each virtual function 110 may count the number of sessions the virtual function 110 has had with the one or more associated engines 120 in the current time slice. When the usage counter 154 has established that all credits for session have been used within the current time slice, the associated one or more engines 120 may pause processing requests for the virtual function 110 until the next time slice begins.

Together, the use of time budgets and credits may enable the arbitration system 100 to share the processing power of the engines 120 according to the amount of processing needed by the various virtual functions 110, while still respecting the priorities of the various logical partitions. Thus, while some embodiments may use time budgets without credits, and while some embodiments may use credits without time budgets, an embodiment that uses both may be more effective in enabling smooth operation of the logical partitions.

In some instances, it may be the case that one or more of the virtual functions 110 complete whatever work they need done prior to using their full time budget in the current time slice. In that case, one or more cycles would remain unused if not reassigned, and unused cycles may be wasteful when other virtual functions 110 have pending unfinished requests. Thus, the arbitration system 100 may reallot a virtual function's unused cycles of a time slice. This reallotment may occur in various ways. For example, and not by way of limitation, the unused cycles may be divided equally or near-equally among the remaining virtual functions 110, or may be divided based in part on priority. In the case of reallotment, even virtual functions 110 with no more credits remaining in the current time slice may be allowed one or more additional sessions with the engines 120 if allotted additional cycles in the current time slice.

The priority arbiters 130 may be in communication with the virtual functions 110, the counters 150, and the engines 120, and may provide requests from the virtual functions 110 to the engines 120. In some embodiments, each priority arbiter 130 may be associated with and may service a single engine 120 or group of engines 120. If a priority arbiter 130 services a group of engines 120, those engines 120 may be capable of performing the same operations, such that all requests handled by a particular priority arbitrator 130 may be manageable by each engine 120 in the group.

Each priority arbiter 130 may have a request queue for maintaining requests. For example, the request queue may be a first-in-first-out (FIFO) queue. When a request reaches the top, or front, of the queue, the priority arbiter 130 may deliver that request to the engine 120.

Each priority arbiter 130 may place requests from the virtual functions 110 on its queue in a selective manner, and these selections may be based on the time budgets and credits of the virtual functions 110. For example, a priority arbiter 130 may opt not to add to its request queue those requests that come from virtual functions 110 that have used up their time budgets or have used up their credits within the current time slice. In this manner, the time budgets and credits may be enforced.

Figure 2:
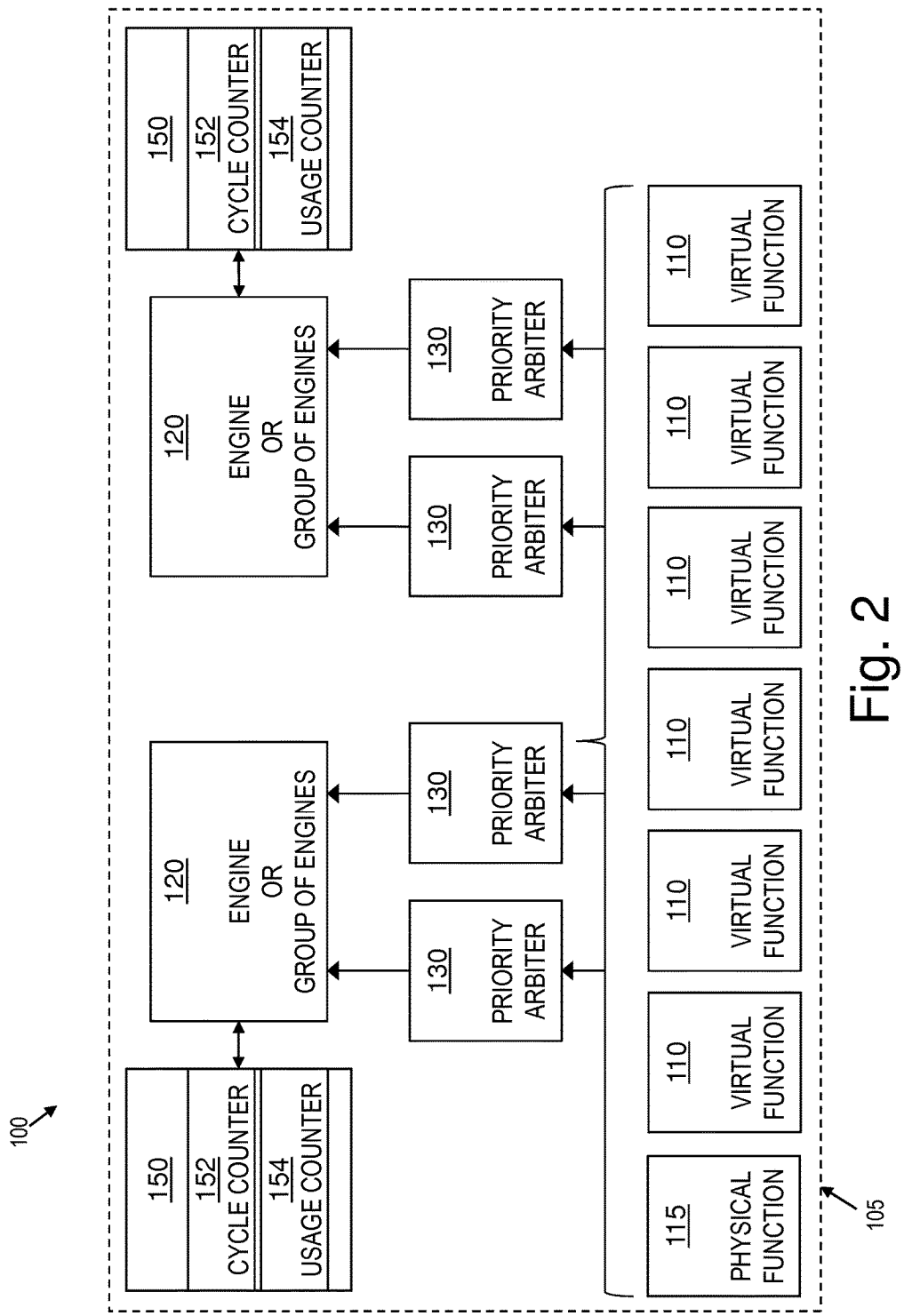
FIG. 2 is a block diagram of a second arbitration system in an SRIOV environment, according to some embodiments of this disclosure.

FIG. 2 is a block diagram of second embodiment of the arbitration system 100 according to this disclosure. As shown, in some embodiments, it need not be the case that only a single priority arbiter 130 services each engine 120 or group of engines 120. Rather, an engine 120 may be associated with multiple priority arbiters 130, which together may speed the delivery of requests to the engine 120 in some cases. When an engine 120 or group of engines 120 is associated with multiple priority arbiters 130, that engine 120 or group may accept requests from its priority arbiters 130 in a round robin fashion, or using some other selection technique such that no priority arbiter 130 is starved out.

Figure 3:
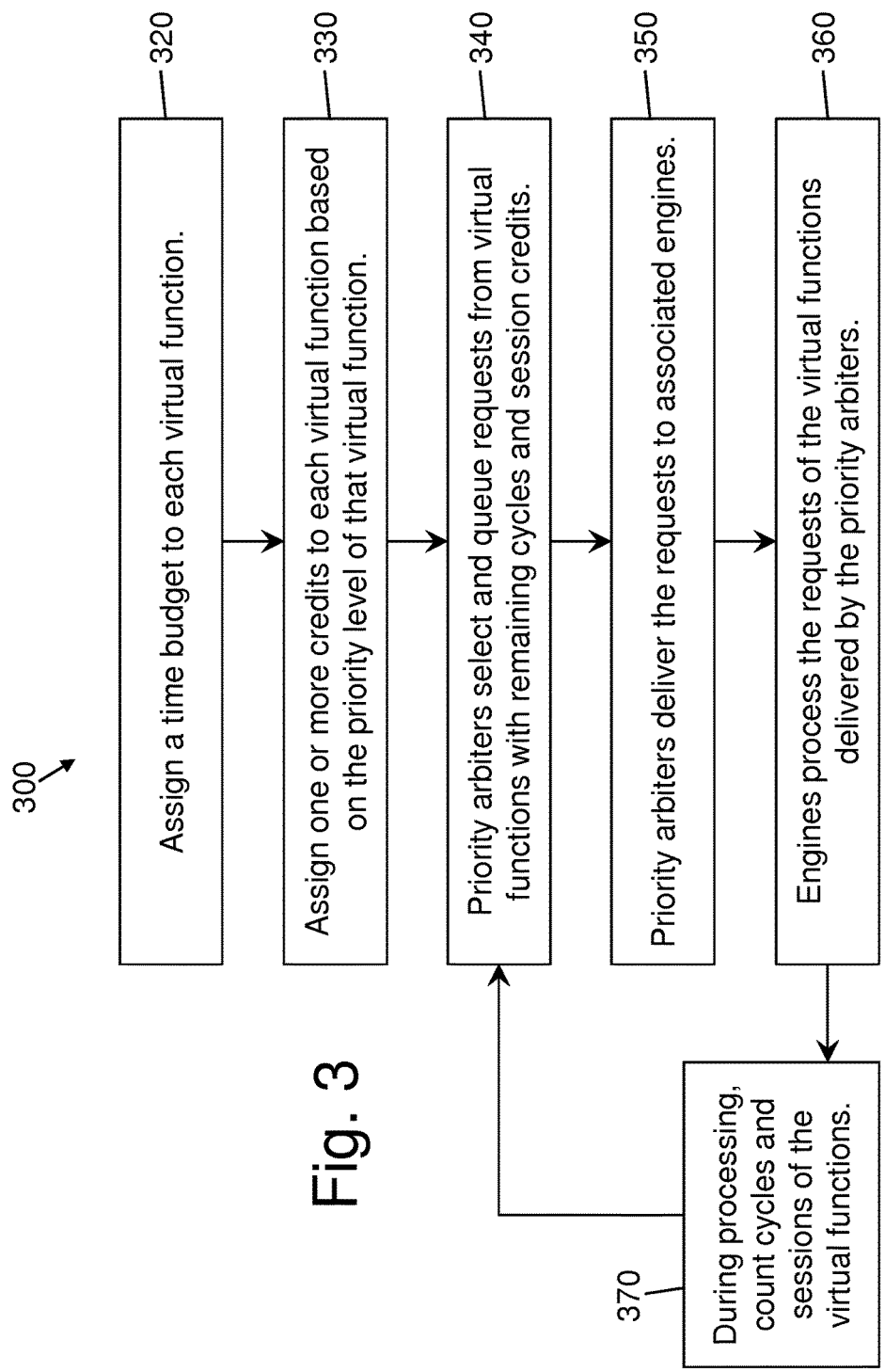
FIG. 3 is a flow diagram of a method for arbitrating requests in an SRIOV environment, according to some embodiments of this disclosure.

FIG. 3 is a flow diagram of a method 300 of arbitrating requests in an SRIOV environment, according to some embodiments of this disclosure. As shown, at block 320, a time budget may be assigned to each virtual function 110. At block 330, one or more credits may be assigned to each virtual function 110 based on priorities of the associated logical partitions. At block 340, while the virtual functions 110 are running, the priority arbiters 130 may select requests from the virtual functions 110 that have not yet used up their time budgets or credits. More specifically, the priority arbiters 130 may opt not to select requests from a virtual function 110 whose time budget or credits have been used in full for the current time slice. At block 350, the priority arbiters 130 may deliver the requests to the engines 120 of the SRIOV environment 150. At block 360, the engines 120 may process the requests of the virtual functions 110 delivered by the priority arbiters 130. The results of this processing may then be returned to the requesting virtual functions 110. During such processing, at block 370, the counters 150 may count the number of cycles and the sessions used by the virtual functions 110 whose requests are being processed. These counts may be provided to the priority arbiters 130 for further selections of requests to be delivered to the engines 120 during the current time slice. It will be understood that the depicted method 300 does not limit the various methods within the scope of this disclosure.

Figure 4:
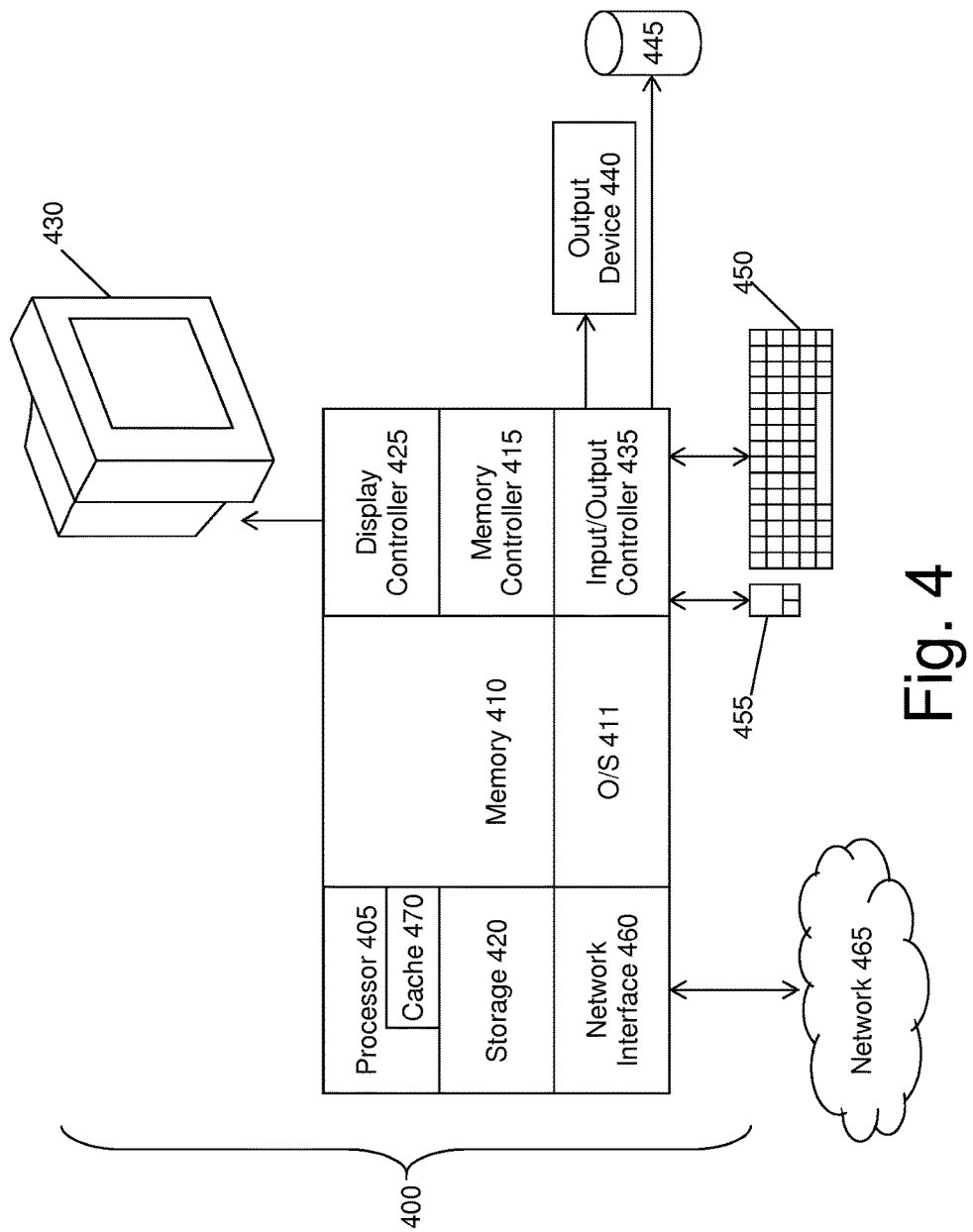
FIG. 4 is a block diagram of a computing device for implementing some or all aspects of the arbitration system, according to some embodiments of this disclosure.

FIG. 4 illustrates a block diagram of a computer system 400 for use in implementing an arbitration system or method according to some embodiments. The arbitration systems and methods described herein may be implemented in hardware, software (e.g., firmware), or a combination thereof. In an exemplary embodiment, the methods described may be implemented, at least in part, in hardware and may be part of a special or general-purpose computer system 400, such as a personal computer, workstation, minicomputer, or mainframe computer.

In an exemplary embodiment, as shown in FIG. 4, the computer system 400 includes a processor 405, memory 410 coupled to a memory controller 415, and one or more input devices 445 and/or output devices 440, such as peripherals, that are communicatively coupled via a local I/O controller 435. For example, in some embodiments, a peripheral may be connected to the computer system 400 by way of an SRIOV-enabled PCIe interface, utilizing an arbitration system 400 according to some embodiments of this disclosure. In some other embodiments, a peripheral connected to the computer system 400 may be a cryptographic card with no SRIOV capability. In that case, a combination of software and hardware on the computer system 100 may manage which work of a set of virtual functions 110 is sent to and performed by the card. These input and output devices 440 and 445 may further include, for example, a printer, a scanner, a microphone, and the like. A conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The I/O devices 440, 445 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 410. The processor 405 may be any custom made or commercially available processor, a central processing unit (CPU), an auxiliary processor among several processors associated with the computer system 400, a semiconductor based microprocessor (in the form of a microchip or chip set), a macroprocessor, or other device for executing instructions. The processor 405 includes a cache 470, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 470 may be organized as a hierarchy of more cache levels (L1, L2, etc.).

The memory 410 may include any one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, or other types of storage media. Note that the memory 410 may have a distributed architecture, where various components are situated remote from one another but may be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (OS) 411. The operating system 411 essentially may control the execution of other computer programs and provides scheduling, input-output control, file and data management, memory management, and communication control and related services.

Additional data, including, for example, instructions for the processor 405 or other retrievable information, may be stored in storage 420, which may be a storage device such as a hard disk drive or solid state drive. In some embodiments, the stored instructions in memory 410 or in storage 420 may include those enabling the processor to execute one or more aspects of the arbitration systems and methods of this disclosure.

The computer system 400 may further include a display controller 425 coupled to a display 430. In an exemplary embodiment, the computer system 400 may further include a network interface 460 for coupling to a network 465. The network 465 may be an IP-based network for communication between the computer system 400 and any external server, client and the like via a broadband connection. The network 465 transmits and receives data between the computer system 400 and external systems. In an exemplary embodiment, the network 465 may be a managed IP network administered by a service provider. The network 465 may be implemented in a wireless fashion, e.g., using wireless protocols and technologies, such as WiFi, WiMax, etc. The network 465 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), intranet or other suitable network system and may include equipment for receiving and transmitting signals.

Arbitration systems and methods according to this disclosure may be embodied, in whole or in part, in computer program products or in computer systems 400, such as that illustrated in FIG. 4.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
running, during an initial period, each of a plurality of virtual functions in a single-root input/output (SRIOV) environment;
assigning a plurality of time budgets to the plurality of virtual functions, wherein the plurality of time budgets comprise a respective time budget for each virtual function of the plurality of virtual functions based on the running of the virtual function during the initial period, and wherein the respective time budget assigned to each virtual function indicates a quantity of cycles on a first engine of the SRIOV environment allowed to the virtual function within each time slice of a plurality of time slices;
wherein a sum of the plurality of time budgets indicates an allotted quantity of cycles that is less than a total quantity of cycles in each time slice;
assigning a plurality of credit sets to the plurality of virtual functions, wherein the plurality of credit sets comprise a respective credit set having a respective one or more credits for each virtual function, and wherein a quantity of credits in the respective credit set of each virtual function represents a priority level of the virtual function;
wherein each virtual function of the plurality of virtual functions is associated with a respective time budget and a respective credit set, and wherein each virtual function is required to have remaining time in the respective time budget and a remaining credit in the respective credit set to run on the first engine;
wherein the quantity of credits in the respective credit set of each virtual function indicates a quantity of sessions on the first engine allowed to the virtual function, and wherein for each virtual function the quantity of cycles on the first engine is a distinct variable from the quantity of sessions on the first engine;
assigning, during a current time slice of the plurality of time slices, one or more remaining cycles not assigned in the current time slice to at least one virtual function of the plurality of virtual functions on an as-needed basis;
selecting, by a computer processor, a plurality of requests issued by the plurality of virtual functions, wherein the selecting comprises identifying one or more virtual functions each having, in the current time slice, both remaining time in the respective time budget and a remaining credit in the respective credit set;
delivering the selected plurality of requests to the first engine for processing;
responsive to processing of each virtual function by the first engine, reducing the respective time budget of the virtual and the respective credit set of the virtual function, wherein the respective time budget is reduced based on an amount of time during which the virtual function is processed by the first engine, wherein the respective credit set is reduced based on a number of sessions of processing the virtual function by the first engine, and wherein the reducing the respective time budget and the respective credit set are performed independently of each other;
resetting the plurality of credit sets of the plurality of virtual functions, at the end of the current time slice; and
resetting the plurality of time budgets of the plurality of virtual functions and beginning a new time slice, at the end of the current time slice.

2. The method of claim 1, further comprising reallocating, to other virtual functions of the plurality of virtual functions, the cycles of the respective time budget of a first virtual function of the plurality of virtual functions within the current time slice when the first virtual function has completed its tasks within the current time slice.

3. The method of claim 1, wherein the selecting the plurality of requests issued by the plurality of virtual functions further comprises selecting a first request from a first virtual function, wherein the delivering the selected plurality of requests to the first engine for processing comprises delivering the first request from the first virtual function to the first engine for processing, and further comprising:
allowing the first virtual function to run on the first engine in the current time slice for an amount of time exceeding the respective time budget of the first virtual function; and
assigning the first virtual function a smaller time budget than the respective time budget of the first virtual function in a next time slice following the current time slice, responsive to allowing the first virtual function to run on the first engine in the current time slice for an amount of time exceeding the respective time budget of the first virtual function.

4. The method of claim 3, wherein the assigning the first virtual function a smaller time budget than the respective time budget of the first virtual function in the next time slice following the current time slice comprises locking the first virtual function out of the first engine in the next time slice.

5. The method of claim 1, wherein the SRIOV environment comprises at least two engines, and further comprising:
assigning a plurality of additional time budgets to the plurality of virtual functions, wherein the plurality of additional time budgets comprise a respective additional time budget for each virtual function of the plurality of virtual functions based on the running of the virtual function during the initial period, and wherein the respective additional time budget assigned to each virtual function indicates a quantity of cycles on a second engine of the SRIOV environment allowed to the virtual function within each time slice of the plurality of time slices.

6. The method of claim 1, wherein the selecting the plurality of requests issued by the plurality of virtual functions comprises:
estimating, for each of the plurality of requests, a quantity of cycles required to complete the request; and
determining, for each of the plurality of requests, whether to select the request based on a quantity of remaining cycles in the respective time budget of the virtual function associated with the request and based on the quantity of cycles required to complete the request.

7. The method of claim 6, wherein the selecting the plurality of requests issued by the plurality of virtual functions comprises selecting a first request, wherein the first request is associated with a first virtual function having at least one cycle remaining in the respective time budget in the current time slice, and wherein the one or more processors are further configured to allow the first request to complete on the first engine during the current time slice after the respective time budget associated with the request has been exceeded.

* * * * *